(12) United States Patent
Barrett

(10) Patent No.: US 11,272,691 B1
(45) Date of Patent: Mar. 15, 2022

(54) MODULAR AVIAN STRUCTURE

(71) Applicant: Carl Elwood Barrett, Fairhope, AL (US)

(72) Inventor: Carl Elwood Barrett, Fairhope, AL (US)

(*) Notice: Subject to any disclaimer, the term of this patent is extended or adjusted under 35 U.S.C. 154(b) by 23 days.

(21) Appl. No.: 16/862,340

(22) Filed: Apr. 29, 2020

Related U.S. Application Data

(60) Provisional application No. 62/840,279, filed on Apr. 29, 2019.

(51) Int. Cl.
*A01K 31/14* (2006.01)
*A01K 39/01* (2006.01)

(52) U.S. Cl.
CPC .............. *A01K 31/14* (2013.01); *A01K 39/01* (2013.01)

(58) Field of Classification Search
CPC ........ A01K 1/03; A01K 1/0245; A01K 31/14; A01K 1/0064; A01K 1/00; A01K 1/0058; A01K 31/00; A63H 3/52; A63H 33/044; A63H 33/008; A63H 33/084; A63H 33/08
See application file for complete search history.

(56) References Cited

U.S. PATENT DOCUMENTS

| | | | | |
|---|---|---|---|---|
| 1,522,815 A | * | 1/1925 | George | A01K 31/14 119/432 |
| 3,643,631 A | * | 2/1972 | Wade | A01K 31/14 119/434 |
| 3,792,685 A | * | 2/1974 | Wiener | A01K 31/14 119/432 |
| 3,804,066 A | * | 4/1974 | Lowe | A01K 31/14 119/431 |
| 4,167,917 A | | 9/1979 | Noll | |
| 5,943,981 A | * | 8/1999 | Chrisco | A01K 31/14 119/428 |
| 6,854,423 B2 | * | 2/2005 | Missry | A01K 39/014 119/429 |
| 2008/0163826 A1 | * | 7/2008 | Kellogg | A01K 39/012 119/431 |

* cited by examiner

*Primary Examiner* — Timothy D Collins
*Assistant Examiner* — Brittany A Lowery
(74) *Attorney, Agent, or Firm* — AdamsIP, LLC

(57) ABSTRACT

A modular avian structure is provided. The structure includes a first shelter member, a second shelter member secured to the first shelter to define an enclosure having an interior volume, and an adjustable partition assembly positioned within the interior volume. Partition panels of the partition assembly may be manipulated to divide the interior volume into multiple different compartmental configurations as desired by a user. Each compartmental configuration is defined by a plurality of separate walled compartments, each of which may be utilized as either a bird dwelling compartment or as a feed storage area.

20 Claims, 7 Drawing Sheets

US 11,272,691 B1

MODULAR AVIAN STRUCTURE

CROSS REFERENCES

This application claims the benefit of U.S. Provisional Application No. 62/840,279, filed on Apr. 29, 2019, which application is incorporated herein by reference.

FIELD OF THE DISCLOSURE

The subject matter of the present disclosure generally relates to avian structures. More particularly, embodiments of the present disclosure relate to avian structures having a modular interior that can be manipulated to assume different compartmental configurations.

BACKGROUND

Avian shelters and avian feeders are commonly used by avian enthusiasts to attract birds to a desired location. Avian shelters are designed to provide a nesting environment in which birds may construct a nest and subsequently dwell. These shelters generally comprise a structure having an interior with one or more empty compartments. Avian feeders, on the other hand, are designed to dispense edible feed and generally comprise a container having an interior filled with feed. As the utility provided by an avian shelter is achieved by virtue of its interior being empty and the utility provided by an avian feeder is achieved by virtue of its interior being filled, the two structures are not typically combined. Rather, avian shelters and avian feeders generally exist as two mutually exclusive structures. Accordingly, avian enthusiasts wanting to provide both a nesting and feeding outlet for birds generally must purchase and subsequently install two separate structures. Additionally, the interior construction of commercially available avian shelters and avian feeders are generally fixed so that the spatial dimensions of the one or more compartments within such structures cannot be modified to provide increased or decreased space within a given compartment. In turn, for avian shelters of this kind, the interior cannot be modified to accommodate changes in feed storage capacity requirements or the spatial needs of a variety of bird species, families, or populations over time, thereby limiting the overall utility of the structure.

Therefore, a need exists in the art for an avian structure that has a modifiable interior and that provides the utility of both an avian shelter and avian feeder.

SUMMARY

The present disclosure provides a modular avian structure for avian nesting and feeding. In one aspect, the avian structure includes a first shelter member, a second shelter member removably secured to the first shelter member to define an enclosure having an interior volume, and a partition assembly disposed within the interior volume that is adapted to adjustably divide the interior volume into a plurality of different compartmental configurations. Each compartmental configuration established by the partition assembly includes a plurality of separate walled compartments, each of which may be utilized as either a bird dwelling place or feed storage area.

In a preferred embodiment, the partition assembly includes a plurality of partition panels and a plurality of securing members. The plurality of securing members may be secured to an interior of the first shelter member and may be configured to secure the plurality of partition panels in an upright position within the interior volume. In one embodiment, the plurality of securing members may be configured to removably secure the plurality of partition panels within the interior volume such that individual partition panels may be secured within or removed from the interior volume as desired through engagement with or disengagement from, respectively, a securing member. Each time a partition panel is added to or removed from the interior volume the compartmental configuration of the interior volume is modified. In this way, users may manipulate the partition assembly to modify the spatial dimensions of the compartments present within the structure's interior volume as desired. In one embodiment, the partition assembly may be manipulated in a variety of ways to divide the interior volume of the structure into a plurality of separate compartments of equal size, unequal size, and/or of a combination of equal and unequal sizes. In some embodiments, the distal ends of opposing partition panels may be adapted to receive the distal ends of one or more other, adjacent partition panels within the partition assembly.

Entry into the interior volume of the shelter from an outside environment may be facilitated by one or more entryways within the first shelter member. The plurality of entryways are preferably spaced about the first shelter such that each compartment of a particular compartmental configuration has at least one entryway permitting access to and from the interior of the compartment. Alternatively, or in addition to the plurality of entryways, the second shelter member may have one or more ports therein, each providing entry into the interior volume from an external environment. In some embodiments, the structure may further include one or more covers which may be utilized in conjunction with the plurality of entryways, one or more ports, or both, to restrict access to certain compartments within the interior volume.

The foregoing summary has outlined some features of the apparatus and methods of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the device and methods disclosed herein. Those skilled in the pertinent art should also realize that such equivalent designs or modifications do not depart from the scope of the device and methods of the present disclosure.

BRIEF DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "removably secured" and grammatical equivalents thereof are used herein to mean the joining of two components in a manner such that the two components are secured together, but may be detached from and reattached to one another without damaging the components and without requiring the use of specialized tools.

Figure 1:
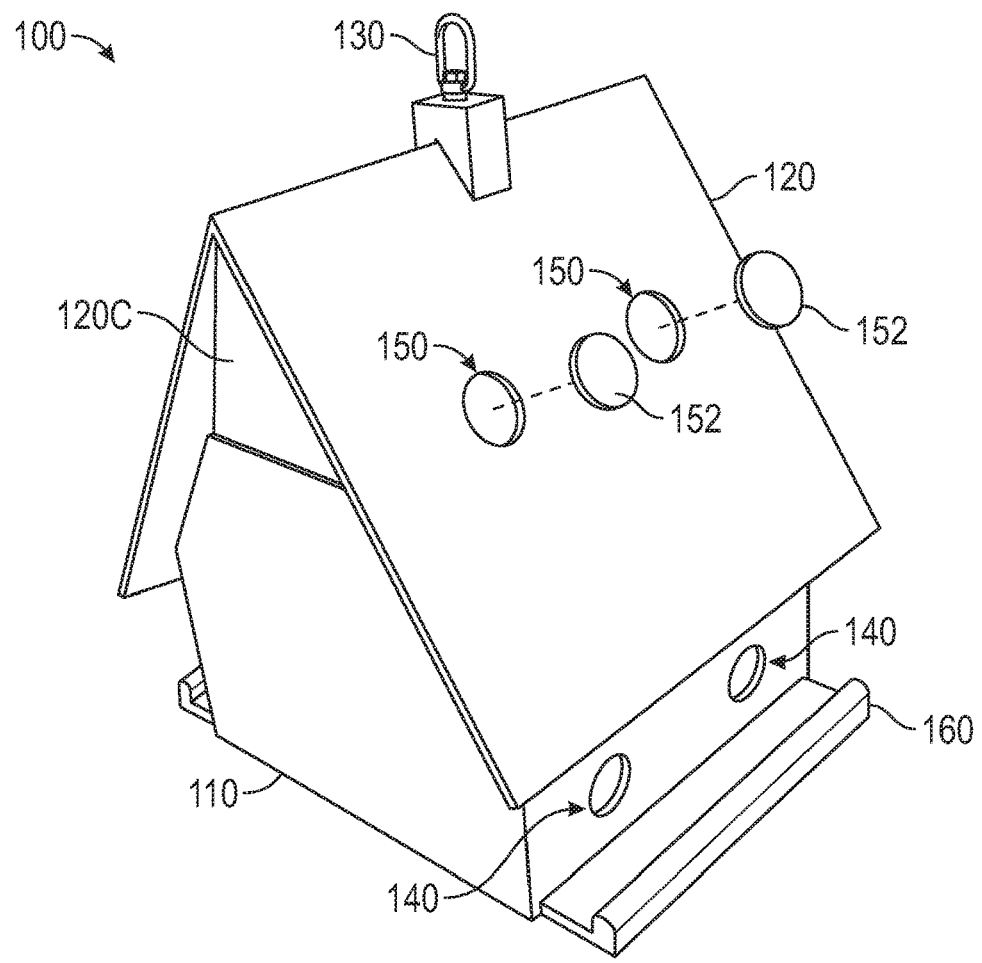
FIG. 1 shows an elevated perspective view of an avian structure constructed in accordance with the present disclosure.
Figure 2:
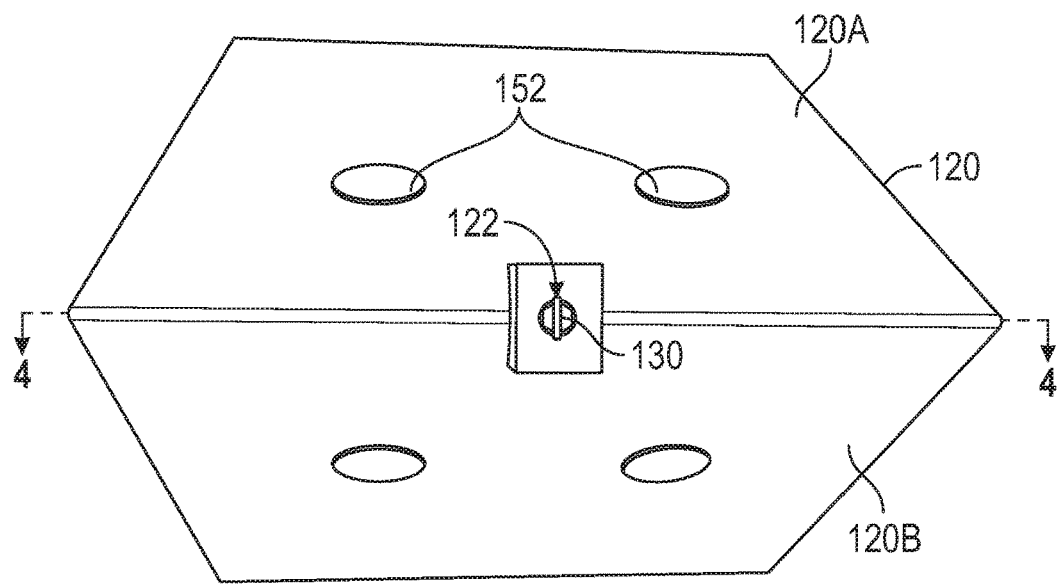
FIG. 2 is a top plan view of an avian structure constructed in accordance with the present disclosure.
Figure 3:
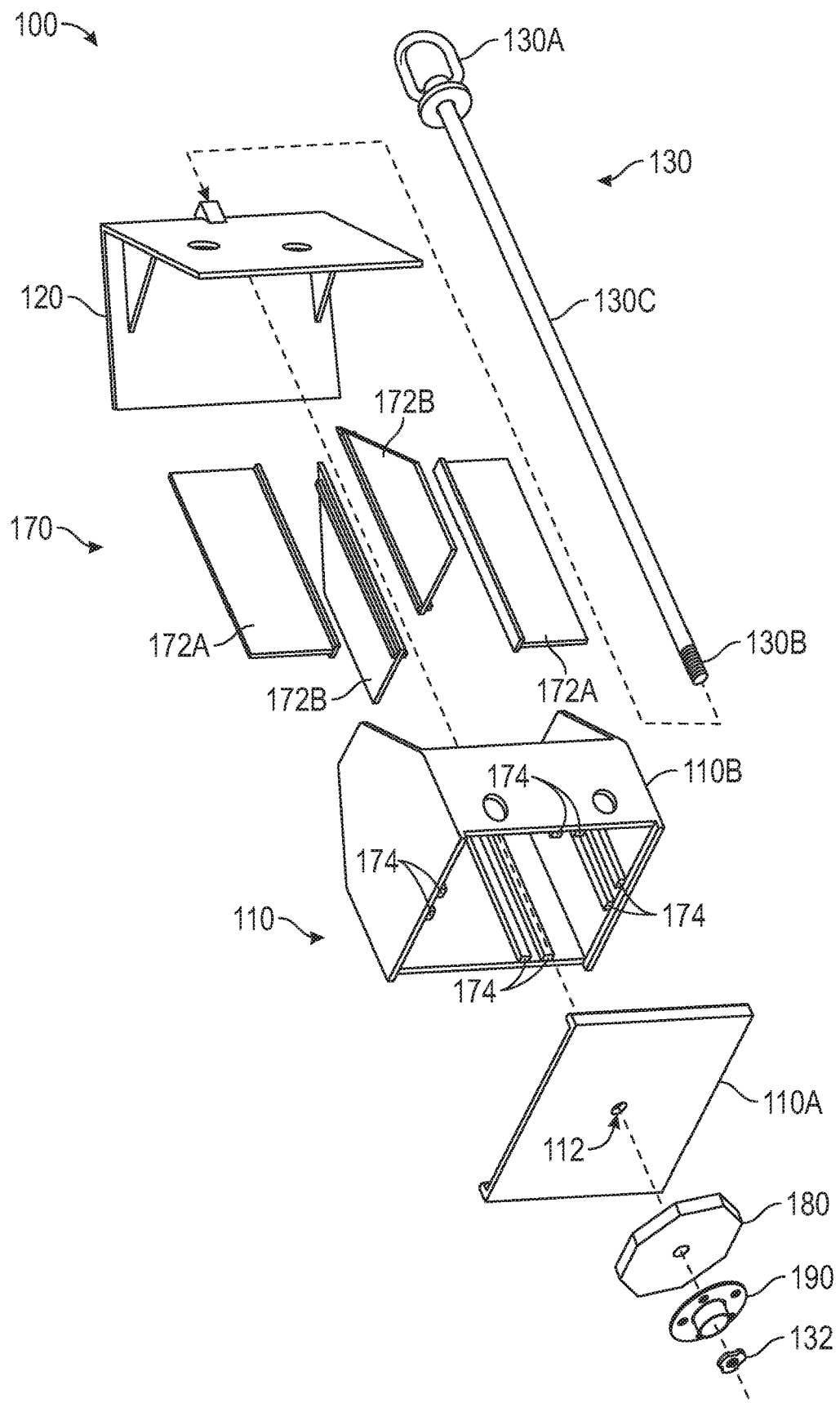
FIG. 3 is an exploded view of an avian structure constructed in accordance with the present disclosure.

A modular avian structure 100 (the "structure") that may be utilized as an avian shelter, avian feeder, or both is provided. As shown in FIGS. 1-3, a structure 100 according to one embodiment of the present disclosure includes a first shelter member 110 and a second shelter member 120. The first shelter member 110 and the second shelter member 120 are removably secured to each other to define an enclosure having an interior volume 115. In a preferred embodiment, the first shelter member 110 has a plurality of entryways 140 therein providing an opening for entry and exit to and from the interior volume 115 of the structure 100. Alternatively, or in addition to, the plurality of entryways 140, in some embodiments, the second shelter member 120 may have one or more ports 150 therein providing an opening for entry and exit to and from the interior volume 115. The plurality of entryways 140 and/or one or more ports 150 may be utilized as a means of entry and exit for birds dwelling within the structure 100 or as an intake through which feed may be introduced into the interior volume 115.

In a preferred embodiment, the structure 100 may further include one or more covers 152 that may be utilized to selectively block passage through the plurality of entryways 140, one or more ports 150, or both. Each cover 152 is sized to cover a single entryway 140 or port 150. In one embodiment, each cover 152 may be sized to plug an entryway 140 or port 150. In some embodiments, the diameter of the entryways 140 within the first shelter member 110 and the diameter of the ports 150 within the second shelter member 120 may be substantially the same so that a given cover 152 may be utilized interchangeably with either an entryway 140 or a port 150.

FIG. 3 shows an exploded view of the structure 100 in accordance with one embodiment of the present disclosure. As shown in FIG. 3, in one embodiment, the first shelter member 110 may comprise a shelter body defined by a base member 110A and one or more sidewalls 110B extending upwardly from the base member 110A, and the second shelter member 120 may define a shelter roof configured to cover the open-end of the shelter body. In some embodiments, the base member 110A may extend beyond the one or more sidewalls 110B so the base member 110A of the shelter body forms one or more avian decks 160 on which birds may perch or feed. The one or more avian decks 160 are positioned adjacent to each of the entryways 140 so that birds may perch on the deck 160 before entering the structure. Alternatively, the one or more avian decks 160 may be structural members separate from the first shelter member 110, but which are secured to the first shelter member. In some embodiments, the second shelter member 120 may be constructed as to form an "A-frame" roof such that two opposing roof panels 120A, 120B are secured in angled relation with an intermediate support structure 120C preferably disposed between the two panels 120A, 120B, as shown in FIGS. 1-3.

As further shown in FIGS. 1-3, in one embodiment, the first shelter member 110 and the second shelter member 120 may be designed such that the exterior of the structure 100 retains a "house-like" appearance. However, one of skill in the art will appreciate that the first shelter member 110 and the second shelter member 120 may be designed or constructed in any manner sufficient to form, when combined, an enclosure having an interior volume 115 in which a partition assembly 170 having the features specified herein may be disposed and still fall within the scope of the present disclosure. Accordingly, the construction of the first shelter member 110 and the second shelter member 120 and the overall appearance of the shelter 100 may vary from that illustrated within the figures and still function in the same manner as the structure 100 described herein.

The first shelter member 110 and the second shelter member 120 may be removably secured together by way of one or more securing devices. As shown best in FIGS. 3 and 6, in one embodiment, the first shelter member 110 and the second shelter member 120 are removably secured together by a first interlocking member 130 and a second interlocking member 132 configured to interlock with the first interlocking member 130. In one such embodiment, the first interlocking member 130 may have a first end 130A, a second end 130B opposite the first end 130A, and a middle portion 130C disposed between the first end 130A and the second end 130B. When the first interlocking member 130 and the second interlocking member 132 are interlocked, thereby removably securing the first and second shelter members 110, 120 together, the first end 130A and the second end 130B of the first interlocking member may be disposed outside the interior volume 115 of the structure 100 while the middle portion 130C of the first interlocking member extends through the first and second shelter members 110, 120 and through the interior volume 115, as best shown in the cross-sectional view of FIG. 2 provided in FIG. 4.

To enable passage of the first interlocking member 130 through the interior volume, the first shelter member 110 and the second shelter member 120 may each have an opening 112 and 122, respectively, through each member. In some embodiments, the second end 130B of the first interlocking member 130 may have a first set of threading and the second interlocking member 132 may have a second set of threading compatible with the first set of threading. In one such embodiment, the first interlocking member 130 may comprise an elongated rod extending through the openings 112, 122 of the first and second shelter members 110, 120 and having at least one threaded end, and the second interlocking member 132 may comprise a fastener such as a threaded nut, which may be removably secured to the threaded end of the rod to removably secure the first and second shelter members 110, 120 together. In one embodiment, the first end 130A of the first interlocking member 130 may include a hanging member, such as a hook or ring, which may be utilized to hang the structure 100 in suspension above a ground surface.

It is understood that the first shelter member 110 and the second shelter member 120 may be secured together in other fashions or manners that permit the structure 100 to switch from an unenclosed configuration, where the interior volume 115 may be accessed by way other than the plurality of entryways 140 or one or more ports 150, to a closed configuration, where the interior volume 115 is accessible only by way of the plurality of entryways 140 or one or more ports 150. As such, other securing devices, e.g., hinges, adapted to removably secure the first shelter member 110 and the second shelter member 120 together and to permit the structure 100 to switch form a unenclosed configuration to an enclosed configuration, or vice versa, may be utilized in place of a first and second interlocking members 130, 132 in some embodiments.

Disposed within the interior of the structure 100 is an adjustable partition assembly 170 that can be selectively manipulated to divide the interior volume 115 into a plurality of different compartmental configurations each having a plurality of walled compartments. In a preferred embodiment, the partition assembly 170 includes a plurality of partition panels 172A, 172B and a plurality of securing members 174 configured to removably secure the partition panels 172A, 172B in an upright position within the interior volume 115. In one embodiment, the partition assembly 170 may be defined by four partition panels 172A, 172B and four securing members 174. However, the number of possible compartmental configurations that may be established within the interior volume 115 may be increased by the inclusion of additional partition panels 172A, 172B and securing members 174 or decreased by reducing the number of partition panels 17A, 172B and securing members 174. Accordingly, in some embodiments the partition assembly 170 may include more than or less than four partition panels 172A, 172B and securing members 174.

Figure 5A:
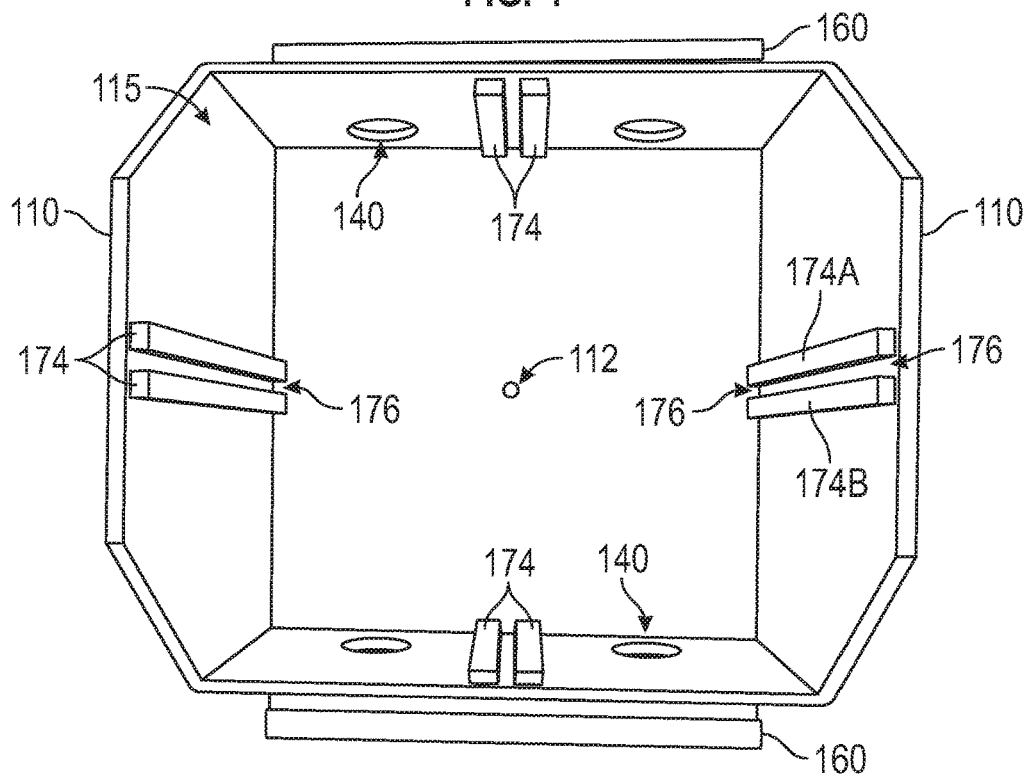
FIG. 5A is a top plan view of a component of an avian structure constructed in accordance with the present disclosure.

In some embodiments, each securing member 174 of the partition assembly 170 may be configured to slidably secure a partition panel 172A, 172B within the interior volume 115 so that the partition panels 172A, 172B may be inserted into or removed from the interior volume by sliding the partition panels 172A, 172B in a defined direction. FIG. 5H shows a partition panel 172A being removed from the interior volume 115 by way of such sliding action.

Each partition panel 172A, 172B has a proximal end that may be associated with a securing member 174 to removably secure the partition panel within the interior volume 115 and a distal end opposite the proximal end. In one embodiment, as best seen in FIG. 5A, each securing member 174 of the partition assembly 170 may include a first securing element 174A and a second securing element 174B attached to an interior surface of the first shelter member 110 in spaced relation to each other so that the pair of securing elements 174A, 174B defines a slot 176 of sufficient width to receive the proximal end of a partition panel 172A, 172B. In a preferred embodiment, as shown in FIGS. 3 and 5A, the first and second securing elements 174A, 174B of each securing member 174 may each comprise an elongated and vertically arranged member attached to an interior surface of a sidewall 110B the first shelter member 110. However, one of skill in the art will appreciate that the securing members 174 may be any device or instrument adapted to removably secure the partition panels 172A, 172B in an upright position within the interior volume 115 to form a plurality of walled compartments.

Depending on the construction of the first shelter member 110 and/or the second shelter member 120, the respective partition panels 172A, 172B of the partition assembly 170 may be of the same shape and size or of varying shapes and sizes. For instance, in an embodiment in which the second shelter member 120 is of an "A-frame" type construction, one or more of the partition panels 172B may be shaped and sized to accommodate two opposing roof panels 120A, 120B secured in angled relation. In one such embodiment, some of the partition panels 172A may retain a generally rectangular shape while other partition panels 172B retain a generally trapezoidal shape, as best seen in FIG. 3, which is shaped to conform to the shape of the roof.

FIG. 5A shows a top view of a structure 100 with the second shelter member 120 removed to better show the interior volume 115. As shown in FIG. 5A, in some embodiments, the partition assembly 170 is designed so that each partition panel 172A, 172B may be removed from the interior volume 115 so that only the securing members 174 of the partition assembly 170 remain therein and a single compartment exists within the interior volume 115. In an embodiment, each securing member 174 of the partition assembly 170 is attached to an interior surface of the first shelter member 110 opposite another securing member 174. The securing members 174 may be attached within the interior surface of the first shelter member 110 so that when a partition panel 172A, 172B is secured thereto, the distal end of the partition panel is disposed adjacent the opening 112 within the base member 110A of the first shelter member 110. In one embodiment, each sidewall 110B of the first shelter member 110 has at least one securing member 174 secured thereto.

FIGS. 5B-5G show a series of example compartmental configurations that may be achieved by manipulating the partition assembly 170. In FIGS. 5B-5G the second shelter member is removed to better show the different compartmental configurations into which the partition assembly may be manipulated. As shown in FIGS. 5B-5G, each compartmental configuration is generally defined by a plurality of individual walled compartments, which, depending on the manner in which the partition assembly 170 is manipulated, may be of equal size, unequal size, or a combination of compartments being of equal and unequal size. It is understood, however, that FIGS. 5B-5G illustrate only some of the potential compartmental configurations into which the interior volume 115 of the structure 100 may be divided by adjusting the partition assembly 170 and that the number of compartmental configurations may increase or decrease depending on the number of partition panels 172A, 172B and the size and shape of the partition panels 172A, 172B, as well as the number and location of securing members 174 of the partition assembly 170.

Figure 5B:
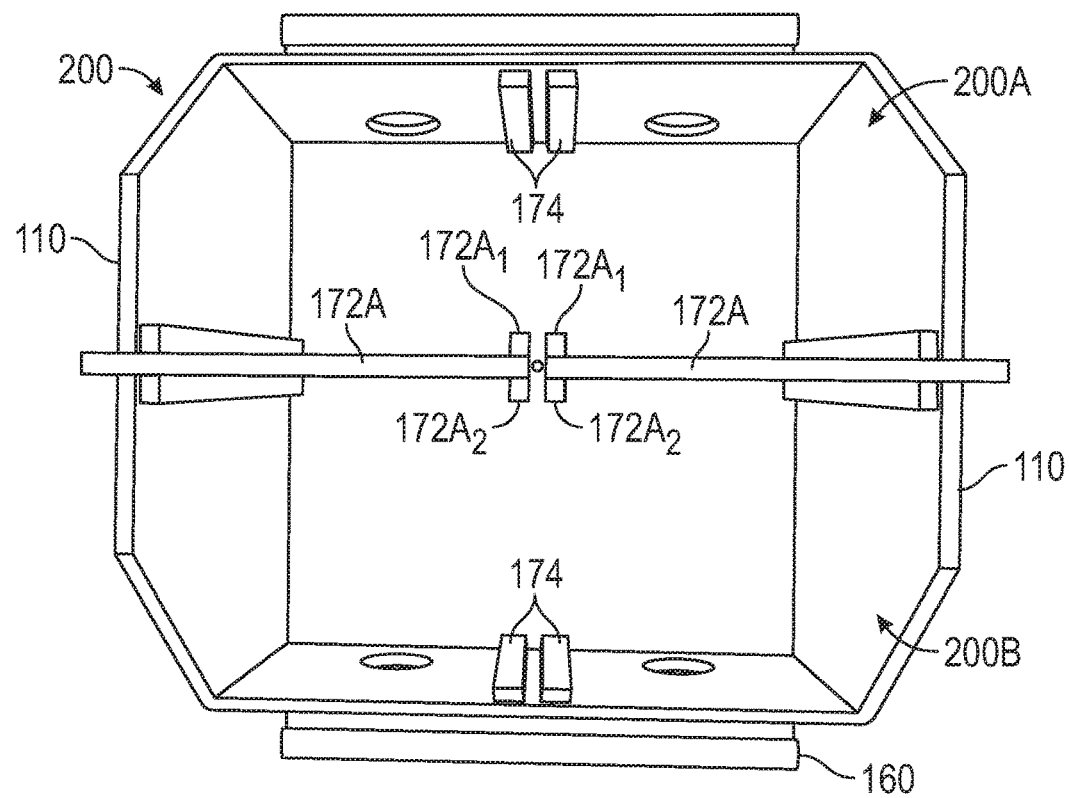
FIG. 5B is a top plan view of a partially assembled avian structure constructed in accordance with the present disclosure showing a first possible compartmental configuration.
Figure 5C:
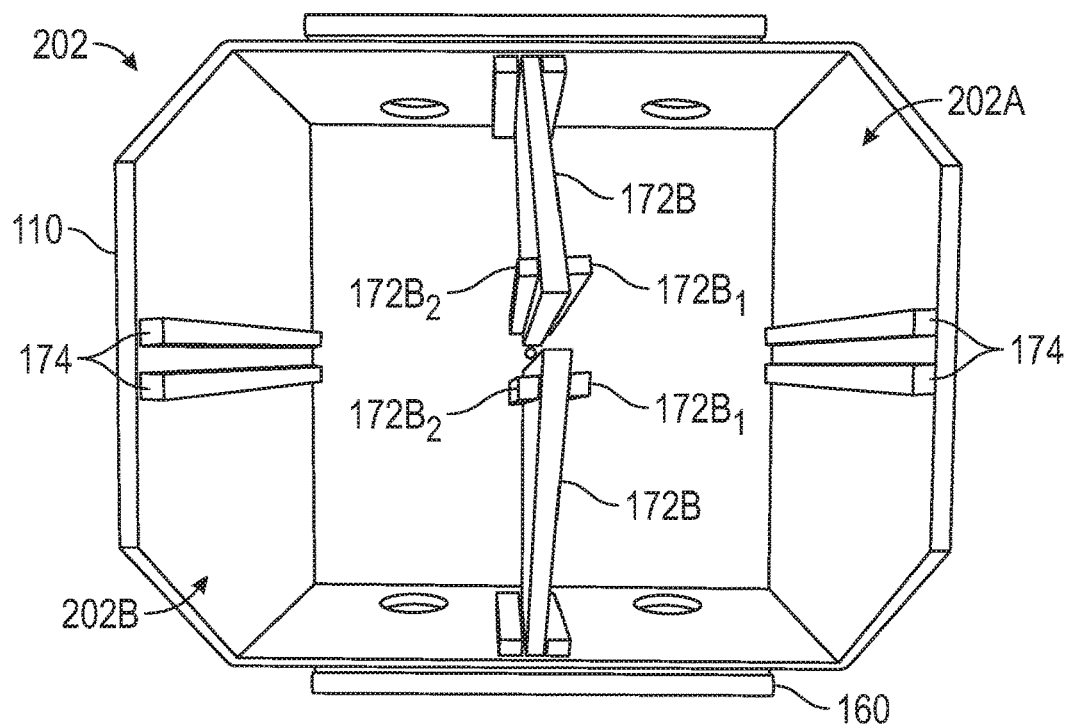
FIG. 5C is a top plan view of a partially assembled avian structure constructed in accordance with the present disclosure showing a second possible compartmental configuration.

FIG. 5B shows a first compartmental configuration 200, defined by two compartments 200A, 200B, into which the interior volume 115 may be divided by adjusting the partition assembly 170. In FIG. 5B, two partition panels 172A are secured opposite each other along a latitudinal plane of the structure 100 to latitudinally divide the interior volume 115 into a first compartment 200A and a second compartment 200B. FIG. 5C shows a similar, second compartmental configuration 202, also defined by two compartments 202A, 202B, into which the interior volume 115 may be divided by adjusting the partition assembly 170. In FIG. 5C, two partition panels 172B are secured opposite each other along a longitudinal plane of the structure 100 to longitudinally divide the interior volume 115 into a first compartment 202A and a second compartment 202B. As further shown in FIGS. 5B-5C, in some embodiments, the securing members 174 of the partition assembly 170 may be secured to the first shelter member 110 such that when two partition panels of the partition assembly 170 are secured opposite each other, the interior volume 115 is divided into two compartments of equal size.

Figure 5D:
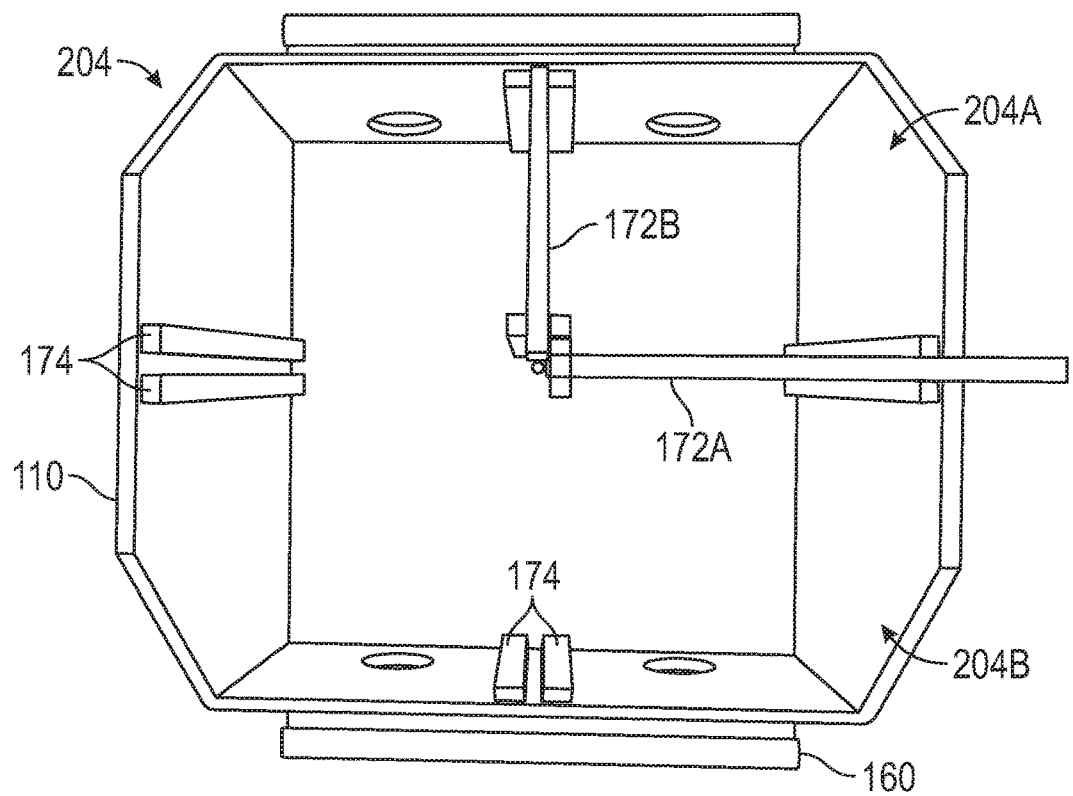
FIG. 5D is a top plan view of a partially assembled avian structure constructed in accordance with the present disclosure showing a third possible compartmental configuration.

FIG. 5D shows a third compartmental configuration 204b, defined by two compartments 204A, 204B, into which the interior volume 115 may be divided by manipulating the partition assembly 170. In FIG. 5D two partition panels 172A, 172B are secured perpendicularly to each other to divide the interior volume 115 into a first compartment 204A and a second compartment 204B. In some embodiments, the securing members 174 of the partition assembly 170 may be attached to the first shelter member 110 such that when two partition panels 172A, 172B are secured perpendicularly to each other, the interior volume 115 is divided into two compartments of unequal size. In some embodiments, when two partition panels 172A, 172B are secured in the foregoing manner, the resulting second compartment 204B may be approximately three times the size of the resulting first compartment 204A.

Figure 5E:
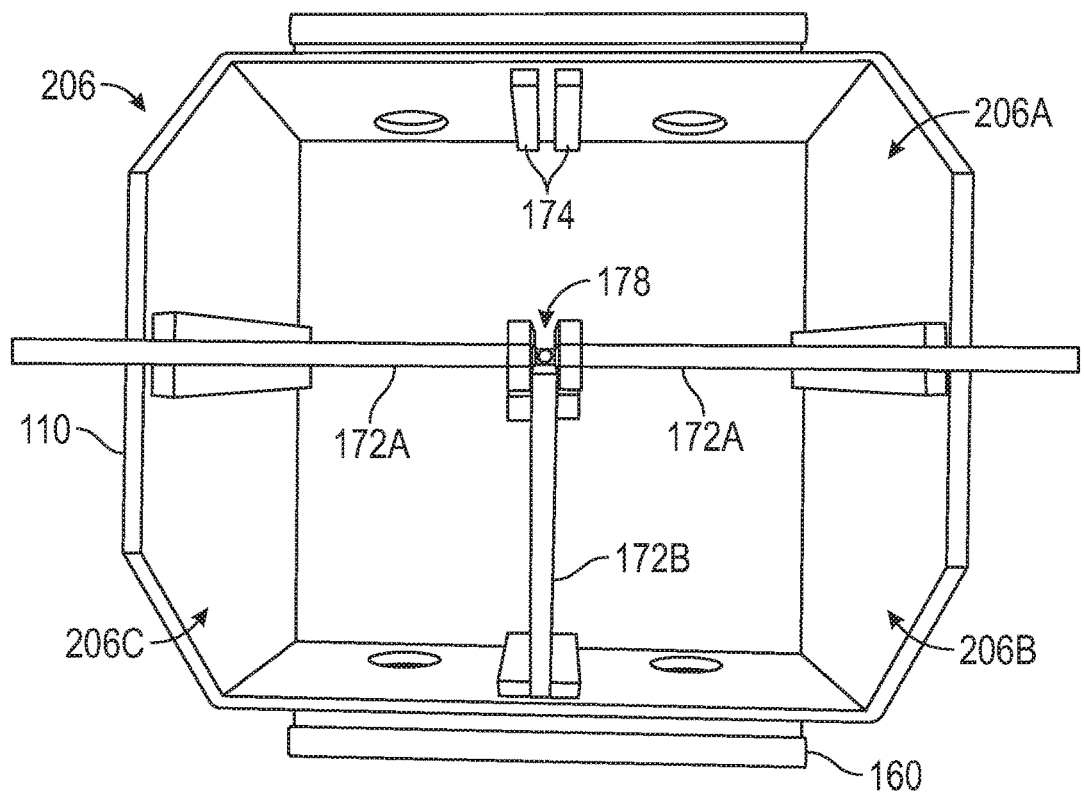
FIG. 5E is a top plan view of a partially assembled avian structure constructed in accordance with the present disclosure showing a fourth possible compartmental configuration.
Figure 5F:
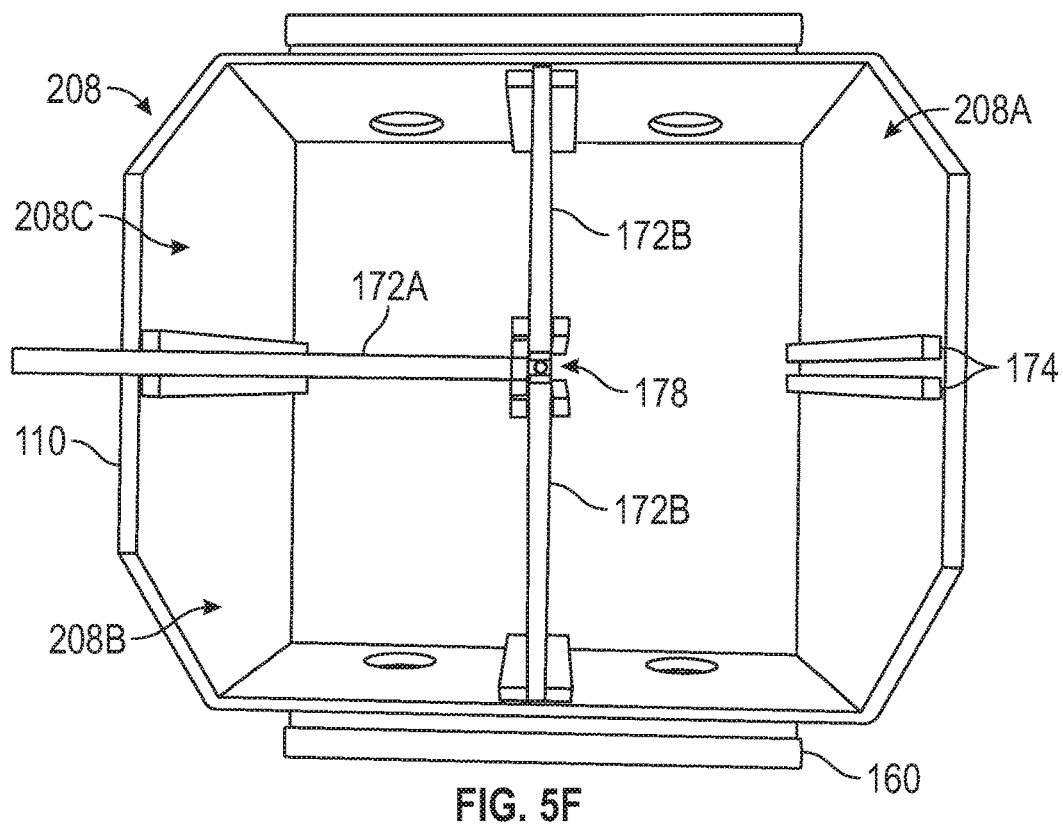
FIG. 5F is a top plan view of a partially assembled avian structure constructed in accordance with the present disclosure showing a fifth possible compartmental configuration.

FIG. 5E shows a fourth compartmental configuration 206, defined by three compartments 206A, 206B, 206C, into which the interior volume 115 may be divided by adjusting the partition assembly 170. In FIG. 5E, a first and second partition panel 172A are secured opposite one another along a latitudinal plane of the structure 100, and a third partition panel 172B is secured perpendicularly to the first and second partition panels 172A such that the interior volume 115 is latitudinally divided and partially longitudinally divided into a resulting first compartment 206A, second compartment 206B, and third compartment 206C. FIG. 5F shows a similar fifth compartmental configuration 208, defined by three compartments 208A, 208B, 208C, into which the interior volume 115 may be divided by manipulating the partition assembly 170. In FIG. 5F, a first and second partition panel 172B are secured opposite each other along a longitudinal plane of the structure 100, and a third partition panel 172A is secured perpendicularly to the first and second partition panels 172B such that the interior volume is longitudinally divided and partially latitudinally divided into a resulting first compartment 208A, second compartment 208B, and third compartment 208C. As shown in FIGS. 5E-5F, in some embodiments, the securing members 174 may be attached to the first shelter member 110 such that when three partition panels are secured in either manner shown in FIG. 5E or 5F, the resulting first compartment 206A, 208A is larger in size than the resulting second compartment 206B, 208B and third compartment 206C, 208C, which are of equal size. In some embodiments, the resulting first compartment 206A, 208A may be approximately twice the size of each of the resulting second compartment 206B, 208B and third compartment 206C, 208C.

Figure 5G:
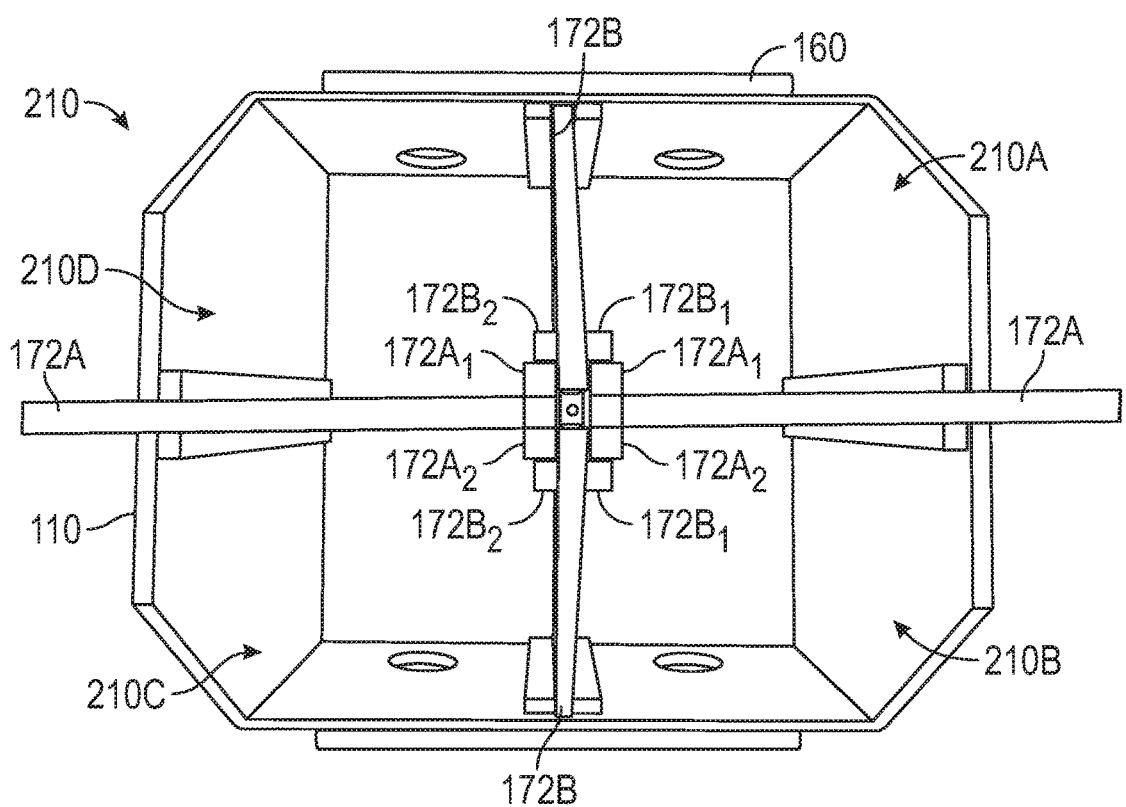
FIG. 5G is a top plan view of a partially assembled avian structure constructed in accordance with the present disclosure showing a sixth possible compartmental configuration.
Figure 5H:
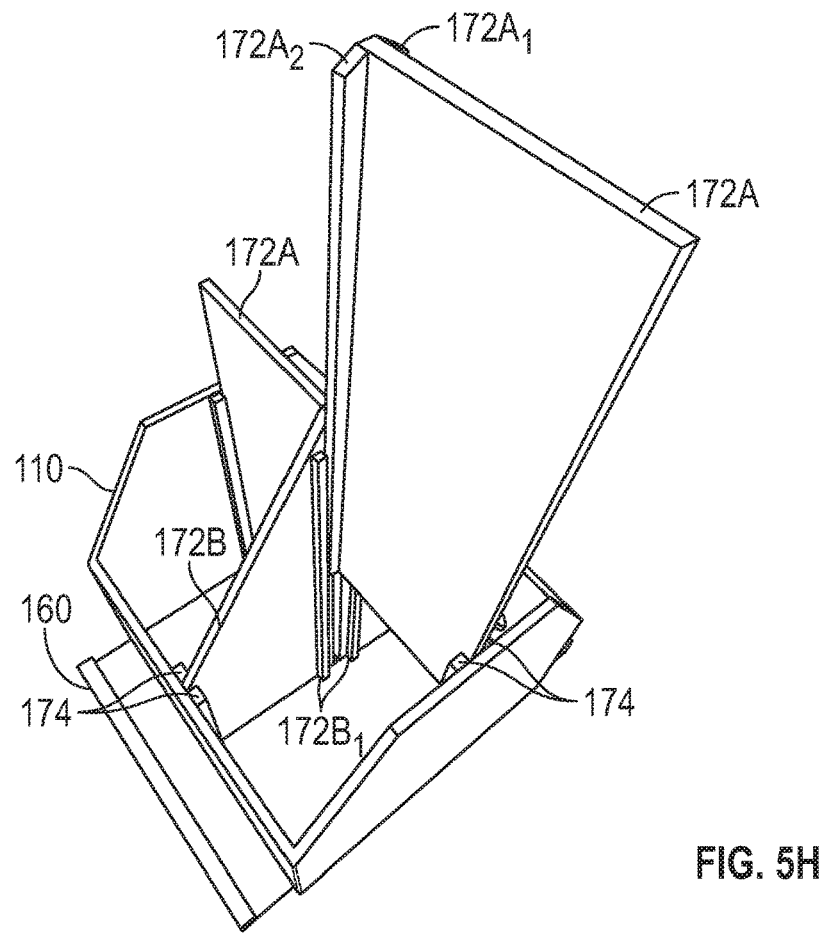
FIG. 5H is a top perspective view of a partially assembled avian structure constructed in accordance with the principles of the present disclosure.

FIG. 5G shows a sixth compartmental configuration 210, defined by four compartments 210A, 210B, 210C, 210D, into which the interior volume 115 may be divided by manipulating the partition assembly 170. In FIG. 5G a first set of partition panels 172A are secured opposite one another along a latitudinal plane of the structure 100 and a second set of partition panels 172B are secured opposite one another along a longitudinal plane of the structure 100, thereby latitudinally and longitudinally dividing the interior volume 115 into a first compartment 210A, a second compartment 210B, a third compartment 210C, and a fourth compartment 210D. In a preferred embodiment, the securing members 174 may be attached to the first shelter member such that when partition panels are secured thereto, the resulting first, second, third, and fourth compartments 210A-210D in the interior volume 115 are of equal size. In a preferred embodiment, when all of the partition panels 172A, 172B of the partition assembly 170 are removably secured within the interior volume 115, the distal ends of the partition panels 172A, 172B may collectively define a passageway through which the elongated rod 130 may be disposed. Accordingly, in some embodiments, the elongated rod 130 may be fixedly disposed adjacent the distal end of each partition panel 172A, 172B present within the interior volume 115 when the structure 100 is assembled and may serve to limit excess movement of the partition panels 172A, 172B within the interior volume 115.

As evidenced within FIGS. 5A-5G, users may install and adjust the partition assembly 170 in a variety of ways to establish a plurality of walled compartments of equal size, unequal size, or a combination thereof, within the interior volume 115. As such, users may manipulate the partition assembly 170 by inserting or removing partition panels 172A, 172B from the interior volume 115 to provide one or more walled compartments for avian nesting, feed storage, or both. Moreover, the ability to adjust the partition assembly 170 enables users to subsequently reconfigure the interior volume 115 and adjust the dimensions of the compartments contained therein should feed storage capacity requirements or the spatial demands of a nesting bird or bird family change over time. For example, as best shown in FIG. 5H, a partition panel 172A may be removed from the sixth compartmental configuration 210 shown in FIG. 5G to convert two previously separate compartments, such as compartments 210A and 210B, into a single, larger compartment, as shown in FIG. 5F. In addition, some compartments of the plurality of walled compartments may be utilized for feed storage so that the shelter 100 may be simultaneously utilized as both a bird dwelling and a bird feeder. For instance, a user may add bird feed into any one of the four walled compartments shown in FIG. 5G, either by removing the roof 120 and adding feed into the top of one of the walled compartments or by adding feed into one of the compartments through the entryway 140 accessing the desired compartment. Once the feed is added, smaller birds may enter the compartment through the entryway 140 to eat the feed, while larger birds may simply perch on the avian deck 160 and eat the feed through the entryway 140 without entering the compartment.

As further shown in FIGS. 5B-5G, in some embodiments, the plurality of entryways 140 within the first shelter member 110 are sufficiently numerous and spaced about the first shelter member such that each compartment within the interior volume 115 has at least one entryway 140 providing access thereto, regardless of the compartmental configuration present within the interior volume 115. In some embodiments, the number of ports 150 within the second shelter member 120 may correspond to the maximum number of compartments that can be established within the interior volume 115. For example, in instances where the partition assembly 170 is defined by four partition panels 172A, 172B and four securing members 174, there may be four ports 150, as shown in FIG. 2. In other embodiments, the number of ports 150 may exceed or be less than the maximum number of compartments that can be established in the interior volume. For compartments within the interior volume 115 a user wishes to prevent access to, one or more covers 152 may be used to cover the one or more entryways 140 or ports 150 providing access to such compartments.

As shown best in FIGS. 5G and 5H, in some embodiments, each partition panel 172A, 172B within the partition assembly 170 may have a first protuberance $172A_1$, $172B_1$ and a second protuberance $172A_2$, $172B_2$ located proximate to its distal end and extending lengthwise along the distal end. The first protuberance $172A_1$, $172B_1$ of each partition panel may extend perpendicularly to the partition panel's distal end in a first direction while the second protuberance $172A_2$, $172B_2$ of each partition panel may extend perpendicularly to the partition panel's distal end in a second direction opposite the first direction.

In a preferred embodiment, the protuberances $172A_1$, $172A_2$, $172B_1$, $172B_2$ associated with the partition panels 172A, 172B in the partition assembly 170 may be arranged such that when two partition panels are secured within the interior volume 115 opposite each other, the first protuberances $172A_1$, $172B_1$ define a first slot 178 sized to receive the distal end of a third partition panel, and the second protuberances $172A_2$, $172B_2$ define a second slot 178 sized to receive the distal end of a fourth partition panel, as shown best in FIG. 5G. The slots 178 may best be seen in FIGS. 5E and 5F. The additional slots 178 formed by the protuberances of opposing partition panels may serve to further secure the partition panels received by such slots 178 in a fixed position within the interior volume 115. As shown in FIG. 5H, in some embodiments, where the distal ends, or portion proximate the distal ends, of the partition panels define such slots 178 and the securing members 174 are adapted to slidably secure partition panels in place, a partition panel may be inserted into the interior volume 115 by aligning its proximal end with a securing member 174 and its distal end with a slot 178 defined by the protuberances of opposing partition panels and sliding the partition panel towards the base member 110A of the first shelter member 110. In such embodiments, a partition panel may be removed by simply pulling the partition panel away from the base member 110A of the first shelter member 110 so that the proximal end of the partition panel slides out of the securing member 174 and the distal end of the partition panel slides out of the slot 178 formed by the protuberances of opposing partition panels.

The protuberances located proximate the distal end of each partition panel may be flush with the distal end of the partition panel, such as the partition panels 172A extending along a latitudinal plane of the structure 100 in FIG. 5G, or may be slightly set back from the distal end of the partition panel, such as the partition panels 172B extending along a longitudinal plane of the structure 100 in FIG. 5G. In some embodiments, each partition panel within the partition assembly 170 may have protuberances $172A_1$, $172A_2$ that extend flush with its distal end. In other embodiments, each partition panel within the partition assembly 170 may have protuberances $172B_1$, $172B_2$ that are slightly set back from its distal end. In one embodiment, some partition panels 172A within the partition assembly 170 may have protuberances that extend flush with its distal end while other partition panels 172B within the partition assembly 170 may have protuberances $172A_1$, $172A_2$ that are slightly set back from its distal end $172B_1$, $172B_2$, as shown in FIG. 5G.

Figure 4:
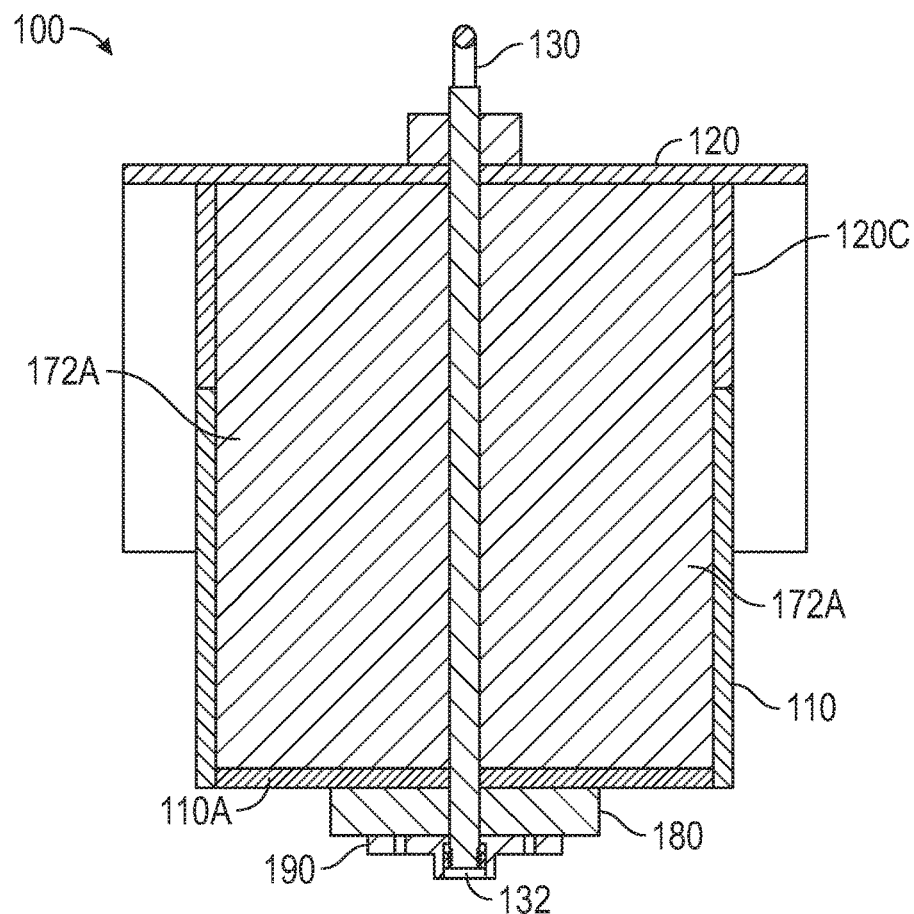
FIG. 4 is a cross-sectional view of the avian structure of FIG. 2 taken along line 4-4.
Figure 6:
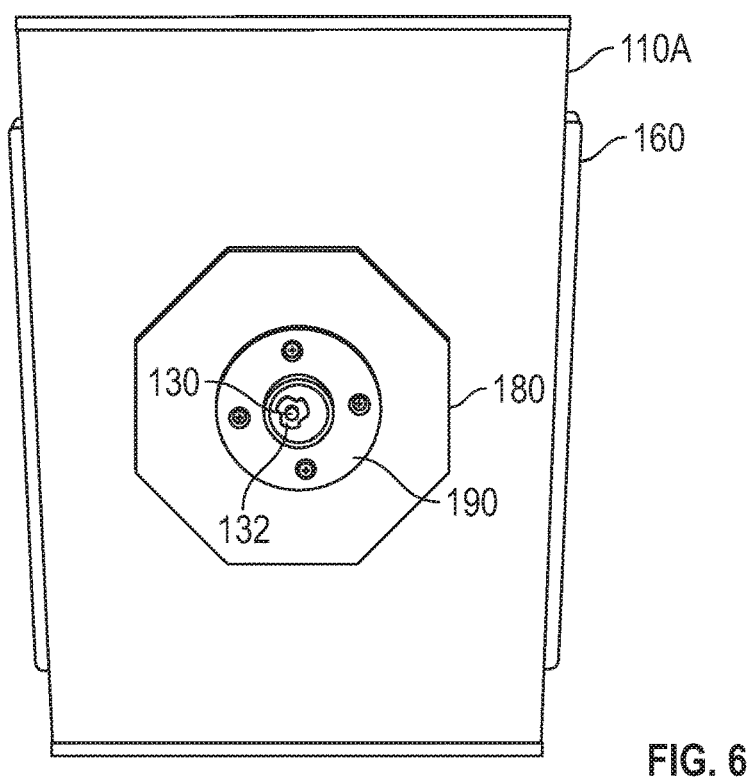
FIG. 6 is a bottom perspective view of an avian structure constructed in accordance with the present disclosure.

FIG. 6 shows a bottom view of the structure 100. Various embodiments of the present disclosure include other features that may also prove beneficial for users. For instance in the embodiment shown in FIG. 6, the structure 100 may further include a platform 180 secured to the exterior of the base member 110A of the first shelter member 110. The platform 180 may serve to provide additional spacing between the base member 110A of the first shelter member 110 and a surface on which the structure 100 rests or an object to which the structure 100 is mounted. To permit passage of the second end 130B of the first interlocking member 130, the platform may have an opening extending therethrough, as best shown in FIGS. 3-4.

To facilitate mounting of the structure 100 to environmental objects, such as an upright pole or post, the structure 100 may further include a mount 190 adapted to secure to such objects. In one such embodiment, the mount 190 may be adapted to secure to a pole or post with threaded members and, to this end, the mount 190 may include a set of threading compatible with the threaded members of the pole or post. The mount 190 may be secured to either the first shelter member 110, the second shelter member 120, or the platform 180 (as shown in FIG. 6), depending on the nature of the object to which the mount 190 is to be secured and/or the orientation in which a user desires the structure 100 to be mounted. Alternatively, the structure 100 may be mounted by hanging the structure 100 from any suitable object. The structure 100 should be mounted in an outdoor position elevated off the ground at a height suitable for use by birds as a birdhouse and/or bird feeder.

The foregoing description of embodiments of the present disclosure has been presented for purposes of illustration and description. It is not intended to be exhaustive or to limit the present invention to the precise form disclosed, and modifications and variations are possible in light of the above teachings or may be acquired from practice of the present disclosure. The embodiments were chosen and described in order to explain the principles of the present disclosure and its practical application to enable one of skilled in the art to utilize the present disclosure in various embodiments and with various modifications as are suited to the particular use contemplated.

What is claimed is:

1. A modular avian shelter, said shelter comprising:
a first shelter member comprising a base member and a plurality of sidewalls extending upwardly from the base member, wherein the base member has an opening therethrough;
a second shelter member that defines a shelter roof, wherein the second shelter member has an opening therethrough;
an elongated rod extending through the opening in the base member and through the opening in the second shelter member;
a fastener removably secured to the rod such that the second shelter member is removably secured to the first shelter member to define an enclosure having an interior volume; and
a partition assembly disposed within the interior volume and adapted to adjustably divide the interior volume into a plurality of walled compartments,
wherein the partition assembly comprises four partition panels and four securing members, wherein each partition panel has a proximal end and a distal end, wherein each respective securing member comprises a pair of vertically arranged securing elements each attached to an interior surface of one of the plurality of sidewalls in a spaced relation to each other such that the pair of securing elements define a securing slot of sufficient width to receive the proximal end of one partition panel therein,
wherein the proximal end of each partition panel is positioned within one respective securing slot defined by one respective pair of securing elements, wherein the distal end of each partition panel is positioned adjacent to the opening within the base member such that the distal ends of the four partition panels collectively define a passageway in which the elongated rod is disposed,
wherein the four partition panels include a first partition panel positioned opposite a second partition panel and a third partition panel positioned opposite a fourth partition panel,
wherein the distal end of the first partition panel has first and second opposing protuberances located proximate to the distal end of the first partition panel and extending lengthwise along the distal end of the first partition panel, wherein the distal end of the second partition panel has third and fourth opposing protuberances located proximate to the distal end of the second partition panel and extending lengthwise along the distal end of the second partition panel,
wherein the first and third protuberances of the first and second partition panels, respectively, form a first partition slot, wherein the distal end of the third partition panel is positioned within the first partition slot, wherein the second and fourth protuberances of the first and second partition panels, respectively, form a second partition slot, wherein the distal end of the fourth partition panel is positioned within the second partition slot, and
wherein the sidewalls of the first shelter member have a plurality of entryways that provide entry from an exterior of the shelter into each respective walled compartment within the interior volume.

2. The modular avian shelter of claim 1, wherein the second shelter member has a plurality of ports that provide entry from an exterior of the shelter into each respective walled compartment within the interior volume.

3. The modular avian shelter of claim 1, further comprising a plurality of covers, wherein each cover is sized to cover one respective entryway.

4. The modular avian shelter of claim 3, wherein each cover is sized to plug one respective entryway.

5. The modular avian shelter of claim 1, further comprising an avian deck positioned adjacent to each respective entryway.

6. A modular avian shelter, said shelter comprising:
a first shelter member comprising a base member and a sidewall extending upwardly from the base member;
a second shelter member that defines a shelter roof, wherein the second shelter member is removably secured to the first shelter member to define an enclosure having an interior volume; and
a partition assembly disposed within the interior volume and adapted to adjustably divide the interior volume into a plurality of walled compartments,
wherein the partition assembly comprises a plurality of partition panels and a plurality of securing members, wherein each respective securing member is attached to an interior surface of the sidewall, wherein the plurality of securing members are configured to removably secure the partition panels in an upright position within the interior volume to form the plurality of walled compartments,
wherein the first shelter member has a plurality of entryways that provide entry from an exterior of the shelter into each respective walled compartment within the interior volume, and
wherein the shelter roof of the second shelter member has a plurality of ports that provide entry from the exterior of the shelter into each respective walled compartment within the interior volume, wherein the shelter roof comprises two opposing roof panels that slope downwardly from a peak at an angle to each other, wherein each respective port of the plurality of ports extends through one respective roof panel of the two roof panels, wherein the shelter further comprises a plurality of covers, wherein each cover is sized to plug one respective port.

7. The modular avian shelter of claim 6, wherein the second shelter member is removably secured to the first shelter member by a first interlocking member comprising an elongated rod extending through a first opening in the first shelter member and through a second opening in the second shelter member and a second interlocking member removably secured to the first interlocking member.

8. The modular avian shelter of claim 6, wherein each respective securing member comprises a pair of vertically arranged securing elements each attached to an interior surface of the sidewall in a spaced relation to each other such that the pair of securing elements define a slot of sufficient width to receive an end of one partition panel therein.

9. The modular avian shelter of claim 8, wherein each partition panel has a proximal end and a distal end, wherein the proximal end of each partition panel is positioned within one respective slot defined by one respective pair of securing elements, wherein the distal ends of opposing partition panels are adapted to receive the distal ends of adjacent partition panels of the partition assembly.

10. The modular avian shelter of claim 6, further comprising an avian deck positioned adjacent to each respective entryway.

11. A method of using a modular avian structure, said method comprising the steps of:
provided a modular avian shelter comprising:
a first shelter member comprising a base member and a sidewall extending upwardly from the base member,
a second shelter member that defines a shelter roof, wherein the second shelter member is configured to removably secure to the first shelter member to define an enclosure having an interior volume, and
a partition assembly adapted to adjustably divide the interior volume into a plurality of walled compartments,
wherein the partition assembly comprises a plurality of partition panels and a plurality of securing members, wherein each respective securing member is attached to an interior surface of the sidewall, wherein the plurality of securing members are configured to removably secure the partition panels in an upright position within the interior volume to form the plurality of walled compartments,
wherein the first shelter member has a plurality of entryways that provide entry from an exterior of the shelter into each respective walled compartment within the interior volume, and
wherein the shelter roof of the second shelter member has a plurality of ports that provide entry from the exterior of the shelter into each respective walled compartment within the interior volume, wherein the shelter roof comprises two opposing roof panels that slope downwardly from a peak at an angle to each other, wherein each respective port of the plurality of ports extends through one respective roof panel of the two roof panels, wherein the shelter further comprises a plurality of covers, wherein each cover is sized to plug one respective port;
installing the partition assembly on the first shelter member to divide the interior volume into a plurality of walled compartments;
removably securing the second shelter member to the first shelter member to form the enclosure with the partition assembly disposed within the interior volume; and
mounting the assembled modular avian structure for use by birds.

12. The method of claim 11, further comprising the step of adding feed into one of the walled compartments through one of the ports of the shelter roof.

13. The method of claim 11, wherein the step of removably securing the second shelter member to the first shelter member comprises inserting an elongated rod through a first opening in the first shelter member and through a second opening in the second shelter member and removably securing a fastener to an end of the rod.

14. The method of claim 11, wherein each respective securing member comprises a pair of vertically arranged securing elements each attached to an interior surface of the sidewall in a spaced relation to each other such that the pair of securing elements define a slot of sufficient width to receive an end of one partition panel therein, wherein the step of installing the partition assembly comprises sliding each respective partition panel downward into a respective one of the slots.

15. The method of claim 14, wherein each partition panel has a proximal end and a distal end, wherein the proximal end of each partition panel is positioned within one respective slot defined by one respective pair of securing elements, wherein the distal ends of opposing partition panels are adapted to receive the distal ends of adjacent partition panels of the partition assembly.

16. The modular avian shelter of claim 1, wherein the distal end of the third partition panel has fifth and sixth opposing protuberances located proximate to the distal end of the third partition panel and extending lengthwise along the distal end of the third partition panel, wherein the distal end of the fourth partition panel has seventh and eighth opposing protuberances located proximate to the distal end of the fourth partition panel and extending lengthwise along the distal end of the fourth partition panel,
wherein the fifth and seventh protuberances of the third and fourth partition panels, respectively, form a third partition slot, wherein the distal end of the first partition panel is positioned within the third partition slot, wherein the sixth and eighth protuberances of the third and fourth partition panels, respectively, form a fourth partition slot, wherein the distal end of the second partition panel is positioned within the fourth partition slot.

17. The modular avian shelter of claim 16, wherein the first and second protuberances of the first partition panel are each disposed in a position flush with the distal end of the first partition panel and the third and fourth protuberances of the second partition panel are each disposed in a position flush with the distal end of the second partition panel, and
wherein the fifth and sixth protuberances of the third partition panel are each disposed in a position that is not flush with the distal end of the third partition panel and the seventh and eighth protuberances of the fourth partition panel are each disposed in a position that is not flush with the distal end of the fourth partition panel.

18. The modular avian shelter of claim 6, wherein the interior volume of the shelter has four walled compartments, wherein the shelter roof has four ports, wherein each respective port of the shelter roof provides entry from the exterior of the shelter into one respective walled compartment.

19. The method of claim 11, wherein the interior volume of the shelter has four walled compartments, wherein the shelter roof has four ports, wherein each respective port of the shelter roof provides entry from the exterior of the shelter into one respective walled compartment.

20. The method of claim 12, further comprising the step of plugging each respective port of the shelter roof with one respective cover after the step of adding feed.

* * * * *